United States Patent [19]

Konijn

[11] Patent Number: 4,880,451
[45] Date of Patent: Nov. 14, 1989

[54] GAS/LIQUID CONTACTING APPARATUS

[75] Inventor: Gerrit Konijn, Amsterdam, Netherlands

[73] Assignee: Shell Oil Company, Houston, Tex.

[21] Appl. No.: 308,488

[22] Filed: Feb. 10, 1989

[30] Foreign Application Priority Data

Mar. 3, 1988 [GB] United Kingdom ............. 8805115

[51] Int. Cl.[4] .............................................. B01D 45/16
[52] U.S. Cl. ................................... 55/237; 261/79.2; 55/257.5
[58] Field of Search ............... 261/79.2; 55/237, 238, 55/257.5

[56] References Cited

U.S. PATENT DOCUMENTS

| 1,094,107 | 4/1914 | Wickersham. | |
|---|---|---|---|
| 1,121,868 | 12/1914 | Riotte et al. . | |
| 1,123,232 | 1/1915 | Brassert et al. . | |
| 1,362,025 | 12/1920 | Macaulay . | |
| 1,511,749 | 10/1924 | Powell . | |
| 2,808,897 | 10/1957 | Reinsch et al. | 183/25 |
| 2,864,463 | 12/1958 | Campbell | 183/81 |
| 2,881,858 | 4/1959 | Krantz et al. | 55/238 |
| 2,890,870 | 6/1959 | Spiselman | 261/30 |
| 2,970,671 | 2/1961 | Warner | 183/34 |
| 3,296,774 | 1/1967 | Hoogendoorn et al. | 55/92 |
| 3,546,851 | 12/1970 | Hardison et al. | 55/257.5 |
| 3,566,582 | 3/1971 | Yankura | 55/238 |
| 3,605,388 | 9/1971 | Zuiderweg et al. | 261/79.2 |
| 4,755,198 | 7/1988 | Darton | 261/79.2 |

FOREIGN PATENT DOCUMENTS

| 1444377 | 11/1968 | France | 261/79.2 |
|---|---|---|---|
| 856501 | 8/1981 | U.S.S.R. | 55/237 |
| 630823 | 10/1949 | United Kingdom . | |
| 902223 | 8/1962 | United Kingdom . | |

Primary Examiner—Tim Miles
Attorney, Agent, or Firm—Ronald R. Reper

[57] ABSTRACT

Gas/liquid contacting apparatus (1) comprising a housing (2) provided with a gas inlet (3), a liquid outlet (5), a liquid inlet (7) and a gas outlet (9) arranged above the gas inlet (3), and a horizontal tray (11) arranged between the gas inlet (3) and the liquid inlet (7) and provided with a cyclonic separator (13) extending from below the horizontal tray (11) to above the horizontal tray (11), which cyclonic separator (13) comprises a vertical swirl tube (17) internally provided with swirl imparting means (19), a coaxial gas outlet tube (21) arranged above the vertical swirl tube (17) and provided externally with an annular deflector (32), an outer tube (23) arranged around the swirl tube (17) and provided at its upper end with an inwardly directed annular deflector (35) and with a gas outlet (33), and at least one conduit (31) extending from the exterior of the cyclonic separator (13) above the tray (11) to the interior of the swirl tube (17) below the swirl imparting means (19).

10 Claims, 2 Drawing Sheets

GAS/LIQUID CONTACTING APPARATUS

BACKGROUND OF THE INVENTION

The present invention relates to a gas/liquid contacting apparatus which can be operated at high volumetric flow rate with little, if any, entrainment of liquid into the flow of gas.

SUMMARY OF THE INVENTION

According to the invention, the appparatus comprises a housing provided with a gas inlet, a liquid outlet, a liquid inlet and a gas outlet arranged above the gas inlet, and a horizontal tray arranged between the gas inlet and the liquid inlet and provided with a cyclonic separator extending from below the horizontal tray to above the horizontal tray, which cyclonic separator comprises a vertical swirl tube internally provided with swirl imparting means, a coaxial gas outlet tube arranged above the vertical swirl tube, an outer tube arranged around the swirl tube so as to define an annular space between the swirl tube and the outer tube opening below the tray, a passage communicating between the interior of the swirl tube above the swirl imparting means and the annular space, and at least one conduit extending from the exterior of the cyclonic separator above the tray to the interior of the swirl tube below the swirl imparting means, wherein the outer tube is provided at its upper end with a closed cover.

DESCRIPTION OF PREFERRED EMBODIMENTS

Figure 1:
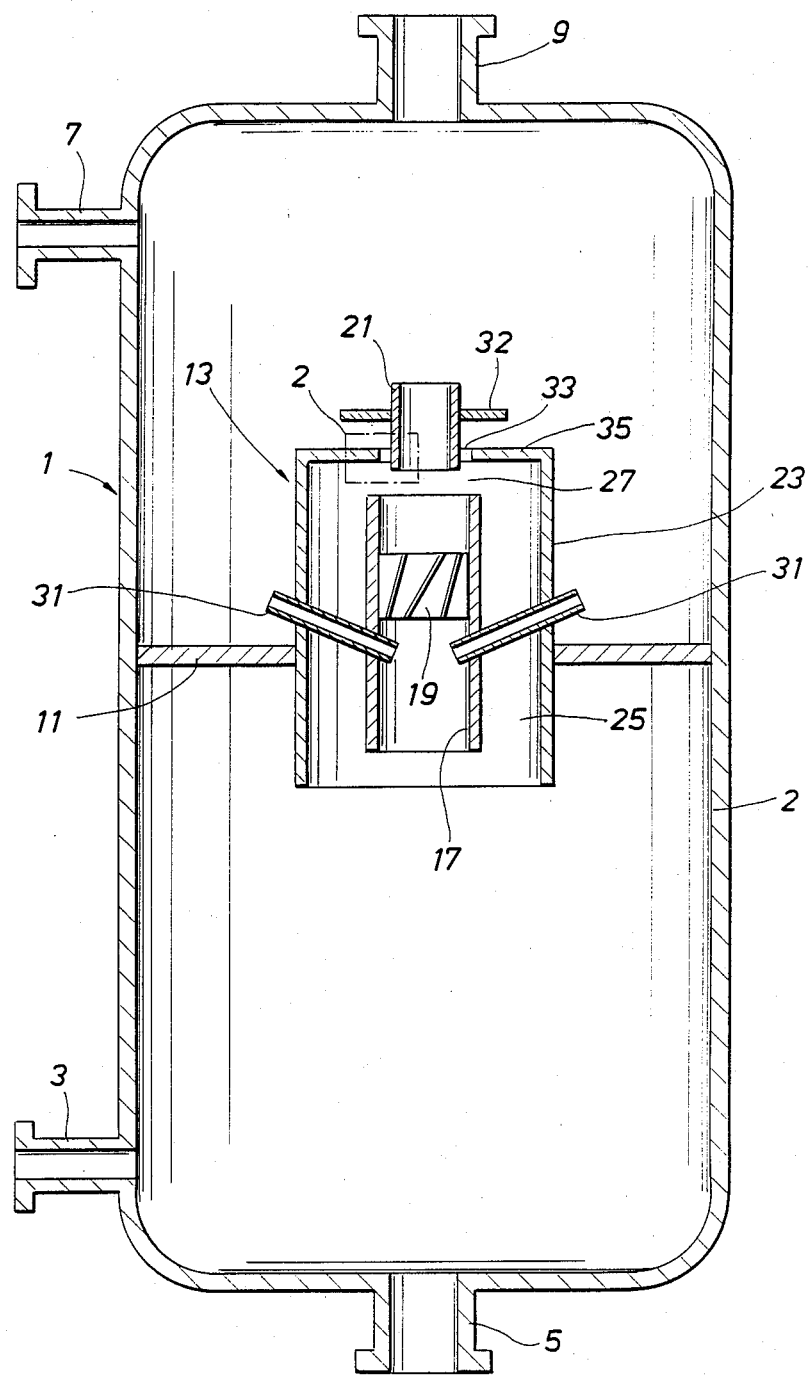
FIG. 1 shows schematically a cross-section a first design of the gas/liquid contacting apparatus according to the invention.

During normal operation of the apparatus gas is supplied to the gas inlet and liquid is supplied to the liquid inlet. Gas flows upwards through the gas/liquid contacting apparatus and liquid flows downwards through the apparatus. Liquid is collected on the tray and flows through the conduit(s) to the interior of the swirl tube below the swirl imparting means where it is brought in contact with the gas. The mixture of gas and liquid passes upwards through the vertical swirl tube internally provided with swirl imparting means. As a result of the swirl imparted to the mixture by the swirl imparting means liquid is separated from the gas/liquid mixture. The liquid is collected on the inner surface of the vertical swirl tube above the swirl imparting means and flows through the passage into the annular space between the outer tube and the swirl tube. Liquid leaves the annular space below the tray and leaves the gas/liquid contacting apparatus through the liquid outlet. Gas, from which liquid has been removed, passes through the coaxial gas outlet tube to the gas outlet above the tray, through which gas leaves the gas/liquid contacting apparatus.

Such a gas/liquid contacting apparatus can be operated at an entrainment level below 5% of the volumetric flow rate of the liquid as supplied on the tray for volumetric flow rates of the liquid below 5 m$^3$/hour at relatively low volumetric flow rates of the gas.

It is an object of the present invention to provide a gas/liquid contacting apparatus which can be operated a higher volumetric flow rate without an entrainment above 5%.

To this end the gas/liquid contacting apparatus according to the invention comprises a housing provided with a gas inlet, a liquid outlet, a liquid inlet and a gas outlet arranged above the gas inlet, and a horizontal tray arranged between the gas inlet and the liquid inlet and provided with a cyclonic separator extending from below the horizontal tray to above the horizontal tray, which cyclonic separator comprises a vertical swirl tube internally provided with swirl imparting means, a coaxial gas outlet tube arranged near the upper part of the vertical swirl tube, an outer tube arranged around the swirl tube so as to define an annular space between the swirl tube and the outer tube opening below the tray, a passage communicating between the interior of the swirl tube above the swirl imparting means and the annular space, and at least one conduit extending from the exterior of the cyclonic separator above the tray to the interior of the swirl tube below the swirl imparting means, wherein the coaxial gas outlet tube is externally provided with an annular deflector, and wherein the outer tube is provided at its upper end with a gas outlet debouching below the annular deflector and with an annular cover of which the inner edge is located around the gas outlet tube below the annular deflector.

It was found that at high liquid volumetric flow rates gas is entrained with the liquid flowing through the passage into the annular space. This gas flows out of the annular space through the gas outlet. Gas flowing out of the gas outlet is deflected by the annular deflector attached to the gas outlet conduit before the gas flows upwards to the gas outlet of the gas/liquid contacting apparatus. Liquid entrained with the gas is separated from the gas when the gas is deflected by the annular deflector; this liquid is then returned to the tray where it joins with the liquid supplied to the tray through the liquid inlet of the gas/liquid contacting apparatus.

Figure 2:
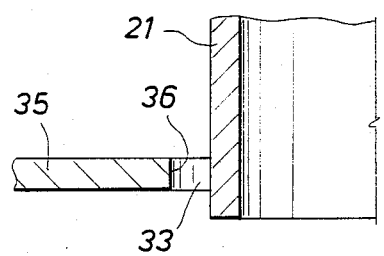
FIG. 2 shows detail II of FIG. 1 drawn on a scale larger than the scale of FIG. 1.
Figure 3:
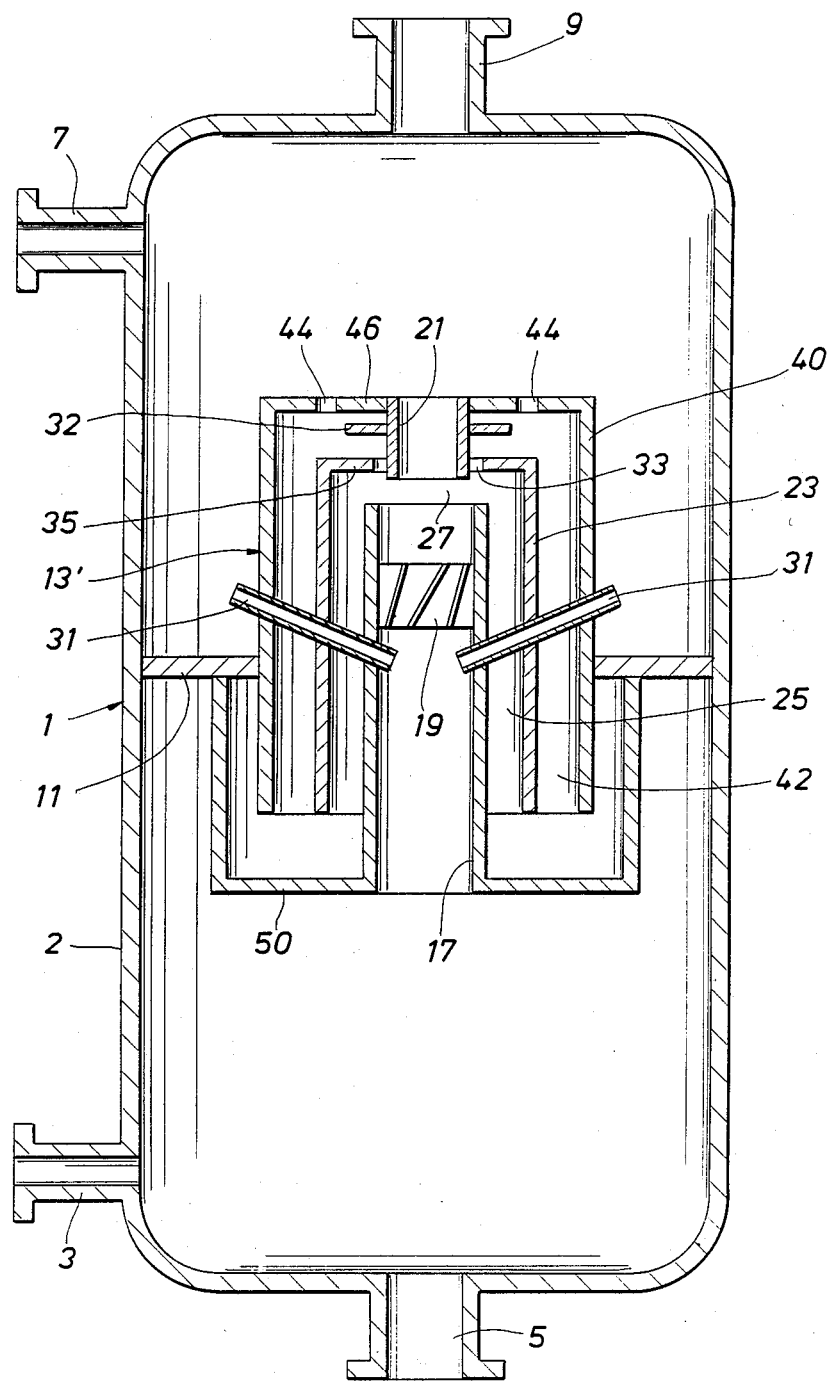
FIG. 3 shows schematically in cross-section a second design of the gas/liquid contacting apparatus according to the invention.

The invention will now be described in more detail by way of example with reference to the drawings, wherein FIG. 1 shows schematically a cross-section a first design of the gas/liquid contacting apparatus according to the invention;

FIG. 2 shows detail II of FIG. 1 drawn on a scale larger than the scale of FIG. 1; and FIG. 3 shows schematically in cross-section a second design of the gas/liquid contacting apparatus according to the invention.

Reference is made to FIGS. 1 and 2. The gas/liquid contacting apparatus 1 comprises a housing 2 provided with a gas inlet 3 and a liquid outlet 5 which are arranged at the lower part of the housing 2, and a liquid inlet 7 and a gas outlet 9 which are arranged above the gas inlet 3. The housing 2 is further provided with a horizontal tray 11 arranged between the gas inlet 3 and the liquid inlet 7. The horizontal tray 11 is provided with a cyclonic separator 13 extending from below the horizontal tray 11 to above the horizontal tray 11.

The cyclonic separator 13 comprises a vertical swirl tube 17 internally provided with swirl imparting means 19, a coaxial gas outlet tube 21 arranged near the upper part of the vertical swirl tube 17, an outer tube 23 arranged around the swirl tube 17 so as to define an annular space 25 between the outer wall of the swirl tube 17 and the inner wall of the outer tube 23 opening below the tray 11. The cyclonic separator 13 further comprises a passage 27 communicating between the interior of the swirl tube 17 above the swirl imparting means 19 and the annular space 25, and conduits 31 extending from the exterior of the cyclonic separator 13 above the tray 11 to the interior of the swirl tube 17 below the swirl imparting means 19.

The coaxial gas outlet tube 21 is externally provided with an annular deflector 32, and the outer tube 23 is provided at its upper end with a gas outlet 33 debouching below the annular deflector 32 and with an annular cover 35 of which the inner edge 36 is located around the gas outlet tube 21 below the annular deflector 32, wherein the gas outlet 33 is the slit between the inner edge 36 and the outer wall of the gas outlet 21.

During normal operation gas is supplied to the gas inlet 3 and liquid is supplied to the liquid inlet 7. Gas flows upwards through the gas/liquid contacting apparatus 1 and liquid flows downwards through the apparatus 1. Liquid is collected on the tray 11 and flows through the conduits 31 to the interior of the swirl tube 17 below the swirl imparting means 19 where it is brought in contact with the gas. The mixture of gas and liquid passes upwards through the vertical swirl tube 17 internally provided with swirl imparting means 19. As a result of the swirl imparted to the mixture by the swirl imparting means 19, liquid is separated from the gas/liquid mixture. The liquid is collected on the inner surface of the vertical swirl tube 17 above the swirl imparting means 19 and flows through the passage 27 into the annular space 25 between the outer tube 23 and the swirl tube 17. Liquid leaves the annular space 25 below the tray 11 and leaves the gas/liquid contacting apparatus 1 through the liquid outlet 5. Gas, from which liquid has been removed, passes through the coaxial gas outlet tube 21 to the gas outlet 9, through which gas leaves the gas/liquid contacting apparatus 1.

Gas which is entrained with the liquid flowing through the passage 27 into the annular space 25 flows out of the annular space 25 through the gas outlet 33. The gas flow is deflected by the annular deflector 32 attached to the gas outlet conduit 21 before the gas flows upwards to the gas outlet 9 of the gas/liquid contacting apparatus 1. Liquid entrained with the gas is separated from the gas when the flow is deflected by the annular deflector 32 and this liquid is then returned to the tray 11 where it is combined with the liquid supplied to the tray 11 through the liquid inlet 7 of the gas/liquid contacting apparatus 1.

Reference is now made to FIG. 3 showing an alternative design of the gas/liquid contacting apparatus according to the invention. In FIG. 3 similar parts of the apparatus have been given the same reference numerals as in FIG. 1, and for the sake of clarity not all parts have been given a reference numeral.

The tray 11 of the gas/liquid contacting apparatus 1 is provided with a cyclonic separator 13', which cyclonic separator 13' further comprises a second outer tube 40 which is arranged around the outer tube 23 so as to define an open-ended second annular space 42 which opens below the tray 11.

The second outer tube 40 is provided at its upper end with gas outlets 44 and with an annular cover 46 of which the inner edge is located around the gas outlet tube above the annular deflector 32.

In addition the lower end of the swirl tube 17 is provided with a sealing pan 50 of which the side walls extend to the lower surface of the tray 11. The sealing pan has an outlet (not shown) which is in fluid communication with the liquid outlet 5. The sealing pan 50 prevents during normal operation gas flowing upwards through the annular spaces 25 and 42. Which is particularly relevant during start-up.

During normal operation gas is supplied to the gas inlet 3 and liquid is supplied to the liquid inlet 7. Gas flows upwards through the gas/liquid contacting apparatus 1 and liquid flows downwards through the apparatus 1. Liquid is collected on the tray 11 and flows through the conduit 31 to the interior of the swirl tube 17 below the swirl imparting means 19 where it is brought in contact with the gas. The mixture of gas and liquid passes upwards through the vertical swirl tube 17 internally provided with swirl imparting means 19. As a result of the swirl imparted to the mixture by the swirl imparting means 19, liquid is separated from the gas/liquid mixture. The liquid is collected on the inner surface of the vertical swirl tube 17 above the swirl imparting means 19 and flows through the passage 27 into the annular space 25 between the outer tube 23 and the swirl tube 17. Liquid leaves the annular space 25 below the tray 11 and flows into the sealing pan 50, from where it is discharged (not shown). The liquid leaves the gas/liquid contacting apparatus 1 through the liquid outlet 5. Gas, from which liquid has been removed, passes through the coaxial gas outlet tube 21 to the gas outlet 9, through which gas leaves the gas/liquid contacting apparatus 1.

Gas which is entrained with the liquid flowing through the passage 27 into the annular space 25 flows out of the annular space 25 through the gas outlet 33. The gas flow is deflected by the annular deflector 32 attached to the gas outlet conduit 21 before the gas flows upwards to the gas outlet 9 of the gas/liquid contacting apparatus 1. Liquid entrained with the gas is separated from the gas when the flow is deflected by the annular deflector 32. This liquid flows through the annular space 42 into the sealing pan 50. Gas entrained with the liquid can leave the annular space 42 through outlets 44.

The gas outlets 44 can be replaced by a gas outlet defined between the inner edge of the annular cover pertaining to the second outer tube and the coaxial gas outlet tube.

The cyclonic separator as described with reference to FIG. 1 can as well be provided with a sealing pan as shown in FIG. 2.

For the sake of clarity, the cyclonic separators 13 and 13' have not been drawn to scale. Suitably, the inner diameter of the gas outlet tube 21 is between 0.5 and 1.0 times the inner diameter of the swirl tube 17, and more suitably between 0.7 and 0.9 times the inner diameter of the swirl tube 17.

The inner diameter of the outer tube 23 is between 1.1 and 2.0 times the outer diameter of the swirl tube 17, and suitably between 1.2 and 1.4 times the outer diameter of the swirl tube 17.

The inner diameter of the swirl tube 17 is between 50 and 150 mm, and the wall thickness of the swirl tube 17, of the gas outlet tube 21 and of the outer tube 23 are between 0.5 and 3 mm.

The overall length of the cyclonic separator 13 is between 300 and 900 mm, and suitably between 450 and 600 mm. This large length of the cyclonic separator allows a large height above the tray 11 which is required to maintain, during normal operation, a sufficient liquid level on the tray so that liquid can flow through the conduits 31 at a sufficiently large flow rate into the swirl tube 17.

Suitably the lower end of the coaxial gas outlet tube 21 is arranged between 20 mm below the upper end of the swirl tube 17 and 60 mm above the upper end of the swirl tube 17.

Suitably the inner diameter of the second outer tube 40 is between 1.05 and 1.25 times the outer diameter of the outer tube 23.

Shown in FIGS. 1 and 3 is a gas/liquid contacting apparatus comprising one tray which is provided with one cyclonic separator. The apparatus may be provided with a plurality of trays, each of which trays is provided with a plurality of cyclonic separators.

When a tray is provided with a plurality of cyclonic separators the cyclonic separators will be arranged in rows. In this case sealing pans of a row of cyclonic separators can be combined in the form of a gutter.

The gas/liquid contacting apparatus according to the invention can suitably be used for removing undesired components, such as hydrogen sulphide, from a gas mixture by contacting the gas mixture with a liquid absorbent for these undesired components.

The gas/liquid contacting apparatus can form the stripping section and/or the enrichment section of a distillation column.

To illustrate the effect of the gas/liquid contacting apparatus, the following tests have been carried out.

The tests were carried out with a single tray provided with a single cyclonic separator. In the tests the liquid was kerosine, and the gas nitrogen. In order to be able to measure entrainment of liquid with gas leaving the gas outlet, the liquid was separately collected.

In the tests for a predetermined volumetric flow rate of the gas as supplied through the gas inlet the volumetric flow rate of the liquid as supplied through the liquid inlet was varied until the liquid entrainment rate was 5% of volumetric flow rate of the liquid. Hereinbelow use is made of the superficial gas velocity, which is the volumetric flow rate of the gas divided by the cross-sectional area of the swirl tube 17.

In the first test a cyclonic separator as shown in FIG. 1 was tested. The dimensions of the cyclonic separator were: inner diameter of the outer tube 150 mm, inner diameter of the swirl tube 110 mm, inner diameter of the gas outlet 90 mm, overall length of the cyclonic separator 475 mm, and distance between the lower end of the gas outlet tube and the upper end of the swirl tube 30 mm. The gas outlet tube was provided with an annular deflector arranged at 25 mm above the upper end of the outer tube and having a diameter of 130 mm. The upper end of the outer tube was provided with a gas outlet in the form of a slit having a width of 5 mm. The cyclonic separator was provided with a sealing pan of the kind as shown in FIG. 2.

The swirl tube was provided with swirl imparting means in the form of 6 blades.

For a superficial gas velocity of 16.8 m/s the 5% entrainment level was reached at a volumetric flow rate of the liquid of 3.8 $m^3$/hour, for a superficial gas velocity of 13.2 m/s the 5% entrainment level was reached at a volumetric flow rate of the liquid of 6.1 $m^3$/hour, and for a superficial gas velocity of 7.0 m/s the 5% entrainment level was reached at a volumetric flow rate of the liquid of 8.0 $m^3$/hour.

In the second test the cyclonic separator as used in the first test was provided with a second outer tube. The inner diameter of the second outer tube was 170 mm. The upper end of the second outer tube was arranged 25 mm above the annular deflector and was provided with a gas outlet in the form of a slit having a width of 24 mm.

The swirl tube was provided with swirl imparting means in the form of 6 blades.

For a superficial gas velocity of 17.0 m/s the 5% entrainment level was reached at a volumetric flow rate of the liquid of 4.1 $m^3$/hour, for a superficial gas velocity of 14.4 m/s the 5% entrainment level was reached at a volumetric flow rate of the liquid of 6.2 $m^3$/hour, and for a superficial gas velocity of 11.4 m/s the 5% entrainment level was reached at a volumetric flow rate of the liquid of 8.1 $m^3$/hour.

For comparison a cyclonic separator was tested which was not provided with an annular deflector, nor was the upper end of the outer tube provided with a gas outlet. The dimensions of the cyclonic separator were: inner diameter of the outer tube 130 mm, inner diameter of the swirl tube 110 mm, inner diameter of the gas outlet 85 mm, overall length of the cyclonic separator 290 mm, and distance between the lower end of the gas outlet tube and the upper end of the swirl tube 40 mm.

The swirl tube was provided with swirl imparting means in the form of 4 blades.

For a superficial gas velocity of 12.1 m/s the 5% entrainment level was reached at a volumetric flow rate of the liquid of 2.0 $m^3$/hour, for a superficial gas velocity of 9.0 m/s the 5% entrainment level was reached at a volumetric flow rate of the liquid of 4.0 $m^3$/hour, and for a superficial gas velocity of 7.2 m/s the 5% entrainment level was reached at a volumetric flow rate of the liquid of 5.0 $m^3$/hour.

In conclusion, the cyclonic separator according to the invention can be operated at higher liquid volumetric flow rates with an entrainment of 5% and at higher gas volumetric flow rates than the cyclonic separator not provided with an annular deflector and wherein the upper end of the outer tube of the cyclonic separator was not provided with a gas outlet.

What is claimed is:

1. Gas/liquid contacting apparatus comprising. an upright housing provided with a gas inlet, a liquid outlet, a liquid inlet and a gas outlet arranged above the gas inlet, and a horizontal tray arranged between the gas inlet and the liquid inlet and provided with a cyclonic separator extending from below the horizontal tray to above the horizontal tray, which cyclonic separator comprises a vertical swirl tube internally provided with swirl imparting means, a coaxial gas outlet tube disposed near the upper part of the vertical swirl tube, an outer tube disposed around the swirl tube so as to define an annular space between the swirl tube and the outer tube opening below the tray, a passage communicating between the interior of the swirl tube above the swirl imparting means and the annular space, and at least one conduit extending from the exterior of the cyclonic separator above the tray to the interior of the swirl tube below the swirl imparting means, wherein the coaxial gas outlet tube is provided externally with an annular deflector, and wherein the outer tube is provided at its upper end with a gas outlet debouching below the annular deflector and with an annular cover of which the inner edge is located around the gas outlet tube below the annular deflector.

2. Gas/liquid contacting apparatus as in claim 1, wherein the gas outlet is disposed between the inner edge of the annular cover pertaining to the outer tube and the coaxial gas outlet tube.

3. Gas/liquid contacting apparatus as in claim 1, wherein said cyclonic separator further comprises a second outer tube disposed around the outer tube and provided at its upper end with a gas outlet and with an annular cover of which the inner edge is located around the gas outlet tube above the annular deflector.

4. Gas/liquid contacting apparatus as in claim 3, wherein said gas outlet is disposed between the inner edge of the annular cover pertaining to the second outer tube and the coaxial gas outlet tube.

5. Gas/liquid contacting apparatus as in claim 1 wherein said swirl tube at its lower end is provided with a sealing pan.

6. Gas/liquid contacting apparatus as in claim 1, wherein said gas outlet tube has an inner diameter less than or equal to the inner diameter of said swirl tube.

7. Gas/liquid contacting apparatus as in claim 6, wherein said inner diameter of the gas outlet tube is between 0.7 and 1.0 times the inner diameter of said swirl tube.

8. Gas/liquid contacting apparatus as in claim 1, wherein said outer tube has an inner diameter between 1.1 and 1.6 times the outer diameter of said swirl tube.

9. Gas/liquid contacting apparatus as in claim 3, wherein said second outer tube has an inner diameter between 1.05 and 1.25 times the outer diameter of said outer tube.

10. Gas/liquid contacting apparatus as in claim 1, wherein the lower end of said coaxial gas outlet tube is disposed between 20 mm below the upper end of said swirl tube and 60 mm above the upper end of said swirl tube.

* * * * *